(12) United States Patent
Murai

(10) Patent No.: US 8,401,160 B2
(45) Date of Patent: Mar. 19, 2013

(54) COMMUNICATION DEVICE

(75) Inventor: Suzuyo Murai, Aichi (JP)

(73) Assignee: Brother Kogyo Kabushiki Kaisha, Nagoya, Aichi-Ken (JP)

( * ) Notice: Subject to any disclaimer, the term of this patent is extended or adjusted under 35 U.S.C. 154(b) by 1191 days.

(21) Appl. No.: 12/240,552

(22) Filed: Sep. 29, 2008

(65) Prior Publication Data

US 2009/0086944 A1    Apr. 2, 2009

(30) Foreign Application Priority Data

Sep. 27, 2007   (JP) .................................. 2007-251301

(51) Int. Cl.
*H04M 11/00*   (2006.01)

(52) U.S. Cl. ......... 379/100.01; 379/142.02; 379/142.04; 358/437; 358/440; 358/444

(58) Field of Classification Search ............. 379/142.04, 379/142.06, 100.01, 142.02; 358/440, 444, 358/437
See application file for complete search history.

(56) References Cited

U.S. PATENT DOCUMENTS

| 6,043,903 A * | 3/2000 | Nakai et al. ................... 358/437 |
| 2007/0071207 A1* | 3/2007 | Kashiwada et al. .......... 379/188 |

FOREIGN PATENT DOCUMENTS

| JP | 2001-61005 | 3/2001 |
| JP | 2001-257766 | 9/2001 |
| JP | 2002-142253 | 5/2002 |
| JP | 2003-283641 | 10/2003 |
| JP | 2003-289375 | 10/2003 |
| JP | 2006-245845 | 9/2006 |

* cited by examiner

*Primary Examiner* — Gerald Gauthier
*Assistant Examiner* — Simon King
(74) *Attorney, Agent, or Firm* — Scully, Scott, Murphy & Presser, PC

(57) ABSTRACT

A communication device is provided. The communication device includes a calling party information receiving unit to receive calling party information, a first call record storing unit to create and store a call record including the calling party information based on receiving conditions of the incoming call, a second call record storing unit to create and store a call record without the calling party information based on receiving conditions of the incoming call, and a call record output unit to output the call records inclusive of the call records stored by the first call record storing unit and by the second call record storing unit.

12 Claims, 6 Drawing Sheets

FIG.6A

| RECORD NUMBER | DATE | TIME | CALLER ID |
|---|---|---|---|
| 01 | March 17 | 01:23 | ANONYMOUS |
| 02 | March 17 | 02:35 | OUT OF RANGE |
| 03 | March 17 | 02:36 | PUBLIC PHONE |
| ⋮ | ⋮ | ⋮ | ⋮ |
| 14 | March 28 | 16:30 | – |
| 15 | March 01 | 02:36 | 427222510 |
| 16 | March 01 | 04:10 | 427222510 |
| 17 | March 03 | 15:21 | – |
| ⋮ | ⋮ | ⋮ | ⋮ |
| 29 | March 15 | 17:11 | 427222510 |
| 30 | March 16 | 16:23 | 427222510 |

NEWEST CALL RECORD → (row 14)
RECORD-WRITE POINTER 1311 → (row 14)
131

FIG.6B

| RECORD NUMBER | DATE | TIME | CALLER ID |
|---|---|---|---|
| 01 | March 17 | 01:23 | ANONYMOUS |
| 02 | March 17 | 02:35 | OUT OF RANGE |
| 03 | March 17 | 02:36 | PUBLIC PHONE |
| ⋮ | ⋮ | ⋮ | ⋮ |
| 14 | March 28 | 16:30 | – |
| 15 | March 01 | 02:36 | 427222510 |
| 16 | March 01 | 04:10 | 427222510 |
| 17 | March 03 | 15:21 | – |
| ⋮ | ⋮ | ⋮ | ⋮ |
| 29 | March 15 | 17:11 | 427222510 |
| 30 | March 16 | 16:23 | 427222510 |

RECORD-WRITE POINTER 1311 → (row 15)
SEARCH POINTER 1312 → (row 17)
131

FIG.6C

| RECORD NUMBER | DATE | TIME | CALLER ID |
|---|---|---|---|
| 01 | March 17 | 01:23 | ANONYMOUS |
| 02 | March 17 | 02:35 | OUT OF RANGE |
| 03 | March 17 | 02:36 | PUBLIC PHONE |
| ⋮ | ⋮ | ⋮ | ⋮ |
| 14 | March 28 | 16:30 | – |
| 15 | | | |
| 16 | March 01 | 02:36 | 427222510 |
| 17 | March 03 | 04:10 | – |
| ⋮ | ⋮ | ⋮ | ⋮ |
| 29 | March 15 | 17:11 | 427222510 |
| 30 | March 16 | 16:23 | 427222510 |

RECORD-WRITE POINTER 1311 → (row 15)
131
↓ SHIFT

COMMUNICATION DEVICE

CROSS REFERENCE TO RELATED APPLICATION

This application claims priority from Japanese Patent Application No. 2007-251301, filed on Sep. 27, 2007, the entire subject matter of which is incorporated herein by reference.

BACKGROUND

1. Technical Field

An aspect of the present invention relates to a communication device.

2. Related Art

Conventionally, a caller ID display service has been provided in telephone networks. When the receiving party who is subscribed to the service receives a call, a telephone number of a calling party is provided to the receiver device from a switchboard so that the calling party can be identified by the receiving party. The telephone number of the caller device received in the service is stored in a memory of the receiver device as a call record regardless of the receiving party's response (e.g., received, connected, or missed) to the call.

In such a caller ID display service, however, when unwanted calls are frequently received in one receiver device, the call records for such unwanted calls are unnecessarily saved in a call history while essential call records are undesirably deleted according to chronological order. In other words, a storage area to store the information concerning the incoming calls can be wasted for the unnecessary call records. In consideration of such a problem, a technique to avoid saving the unwanted call records has been suggested. For example, in Japanese Patent Provisional Publication No. 2003-283641, an unwanted call is determined based on a period of a ring tone being generated, and when the call is determined to be an unwanted call, a call record for the unwanted call is not saved. Thus, the memory area to store the call records can be effectively used.

SUMMARY

However, even in the above configuration, in which the call record is created based on telephone numbers of the calling parties being provided according to the caller ID display service, a call record is not created when the receiving party is not subscribed to the service. Additionally, when the receiving party is subscribed to the service, but if the connection to the line is in a faulty condition, the telephone number of the calling party may not be received by the receiver device. For example, when an incoming call is received in the receiver device with an automatic answering function being activated, but the caller ID is not received due to the reasons as described above, a call record for such an incoming call is not created. In such a case, the memory area to store the call records may not be wasted, but the receiving party is not notified of the call unless the caller leaves a message in the automatic answering system In view of the above drawbacks, the present invention is advantageous in that a communication device, capable of notifying the receiving party of information concerning the incoming call regardless of presence or absence of the caller ID information, is provided. Further, the communication device can eliminate the information concerning the incoming calls which can be considered to be rather non-utilizable to the receiving party so that the memory area to store the call records can be effectively occupied by rather utilizable call records.

According to another aspect of the invention, a communication device is provided. The communication device includes a calling party information receiving unit to receive calling party information, which is information concerning a calling party of an incoming call to the communication device and provided by a switchboard upon receipt of the incoming call, a first call record storing unit to create a call record including the calling party information based on receiving conditions of the incoming call when the calling party information is received by the calling party information receiving unit and store the created call record in a call record storage unit, a second call record storing unit to create a call record without the calling party information based on receiving conditions of the incoming call when the calling party information is unavailable to the calling party information receiving unit and store the created call record in the call record storage unit, and a call record output unit to output the call records inclusive of the call records stored by the first call record storing unit and by the second call record storing unit.

According to the above configuration, the call record including the calling party information and the call record without the calling party information are collectively output. Therefore, the call records can be notified to the receiving party regardless of absence and presence of the calling party information so that the receiving party can be aware of each incoming call.

BRIEF DESCRIPTION OF THE ACCOMPANYING DRAWING

FIGS. 6A-6C illustrate the incoming call history memory area in the facsimile machine according to the embodiment of the present invention.

DETAILED DESCRIPTION

Figure 1:
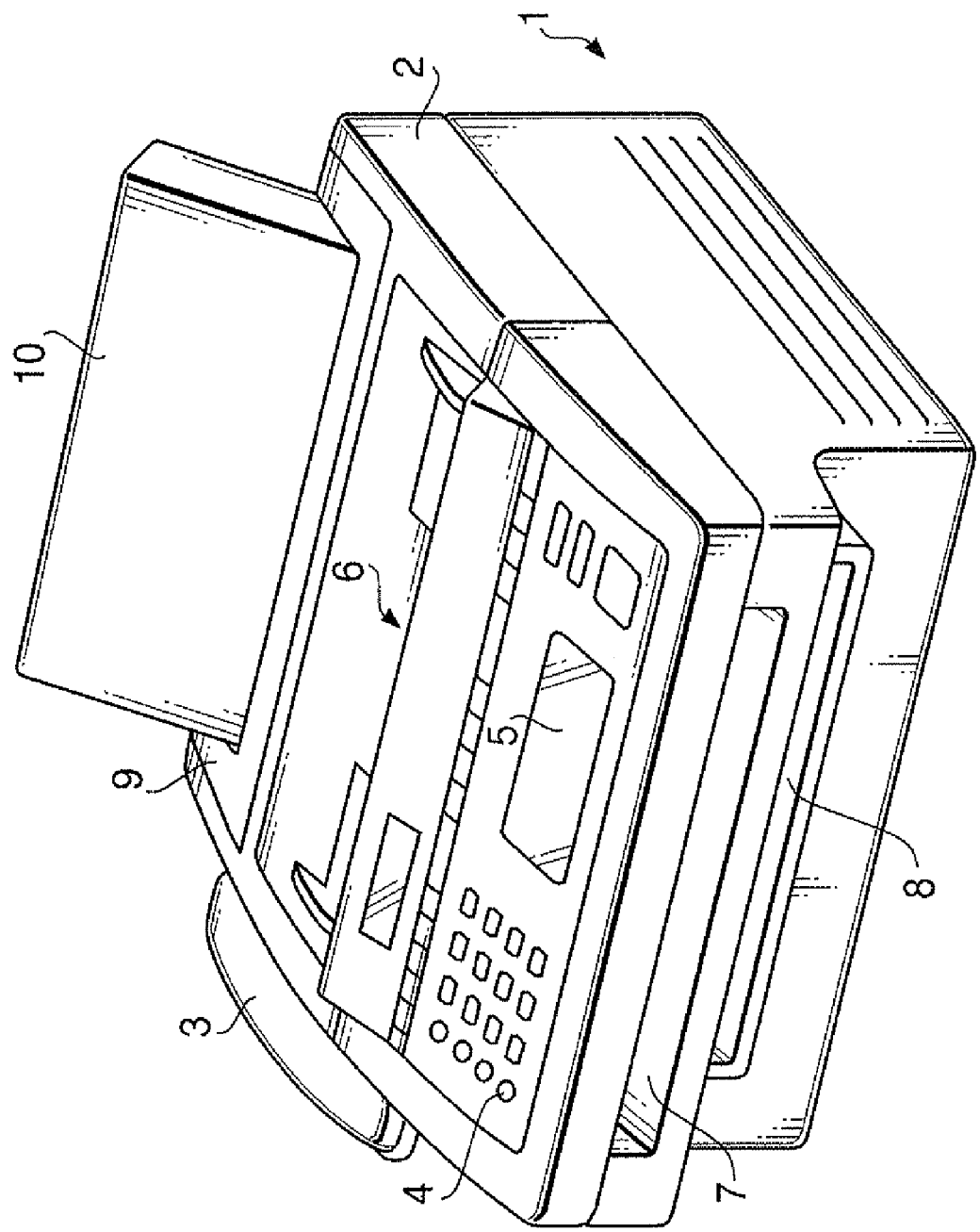
FIG. 1 illustrates a perspective view of a facsimile machine according to an embodiment of the present invention.

Hereinafter an embodiment according to an aspect of the present invention will be described with reference to the accompanying drawings. FIG. 1 illustrates a perspective view of a facsimile machine 1 according to an embodiment of the present invention. The facsimile machine 1 is configured to read an image of an original document, generate image data based on the read image, and transmit the image data to an external device through a telephone line 31 (see FIG. 2). Further, the facsimile machine 1 receives image data transmitted through the telephone line 31 and reproduce the image based on the image data to output the image on a recording medium.

The facsimile machine 1 includes a body 2, and is provided with a handset 3 on one side of the body 2. The handset 3 is placed on a hookswitch button (not shown) arranged on the body 2 when a call is not made. When a call is made, the handset 3 is lifted off the hookswitch. The former condition is referred to as "on-hook," while the latter condition is referred to as "off-hook." The facsimile machine 1 is further provided with an operation panel 4 having a plurality of operational keys at a front portion of a top surface. An LCD 5 is provided at a substantial center portion of the operation panel 4. The facsimile machine 1 is operated according to inputs to the operational keys, and information concerning the operational condition of the facsimile machine 1 and instructions to the user are displayed on the LCD 5.

A document inlet 6 is provided in a middle portion of the top surface of the body 2. An original document to be transmitted from the facsimile machine 2 is inserted into the body 2 through the document inlet 6. The original document having been read is discharged out of the body 2 through a document outlet 7, which is formed below the operation panel 4. Further, the facsimile machine 1 is provided with a sheet-holder attachment portion 9, to which a recording sheet holder 10 is detachabley attached. A stack of recording sheets, on which the images are to be formed, is held in the recording sheet holder 10 to be set in the facsimile machine 1. The recording sheet with the image formed thereon is discharged from the recording sheet outlet 8, which is formed below the document outlet 7.

Figure 2:
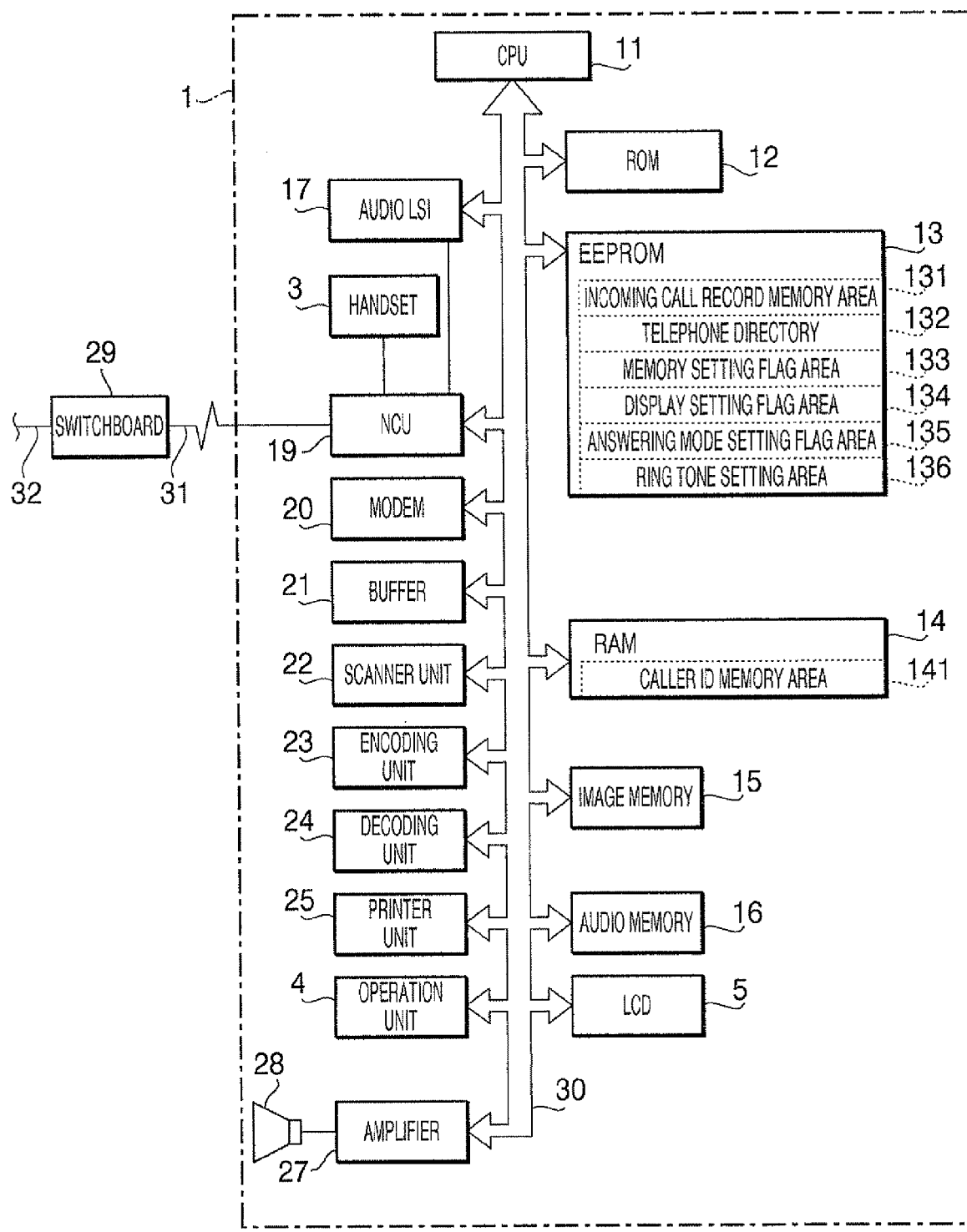
FIG. 2 is a block diagram to illustrate an electrical configuration of the facsimile machine according to the embodiment of the present invention.

FIG. 2 is a block diagram to illustrate an electrical configuration of the facsimile machine 1 according to the embodiment of the present invention. The facsimile machine 1 includes a CPU 11, a ROM 12, an EEPROM 13, a RAM 14, an image memory 15, an audio memory 16, an LCD 5, an audio LSI 17, an NCU (network control unit) 19, a modem 20, a buffer 21, a scanner 22, an encoding unit 23, a decoding unit 24, a printer unit, the operation panel 4, and an amplifier 27, which are interconnected through a bus line 30.

Figure 4:
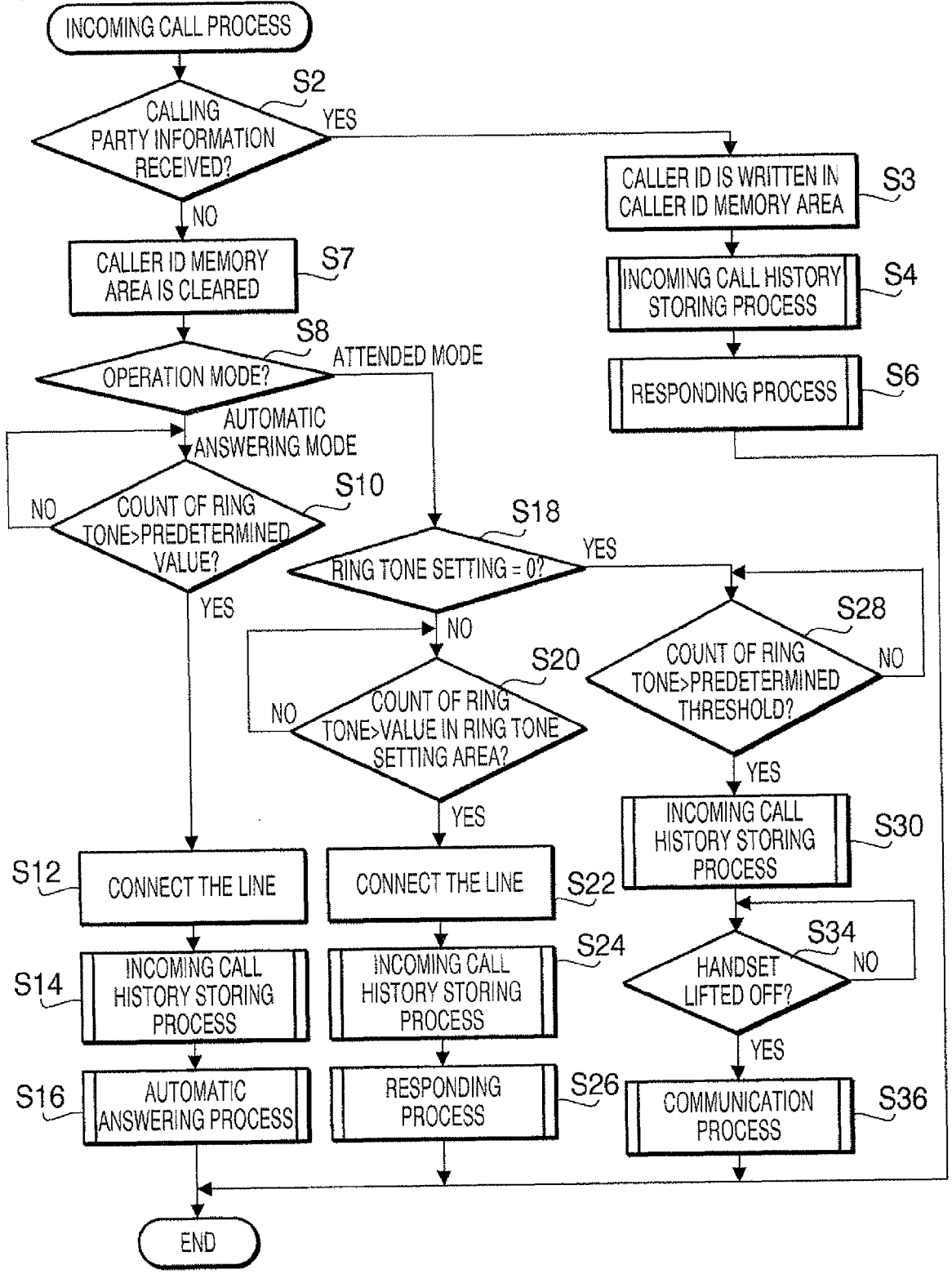
FIG. 4 is a flowchart to illustrate an operation to process an incoming call in the facsimile machine according to the embodiment of the present invention.
Figure 5:
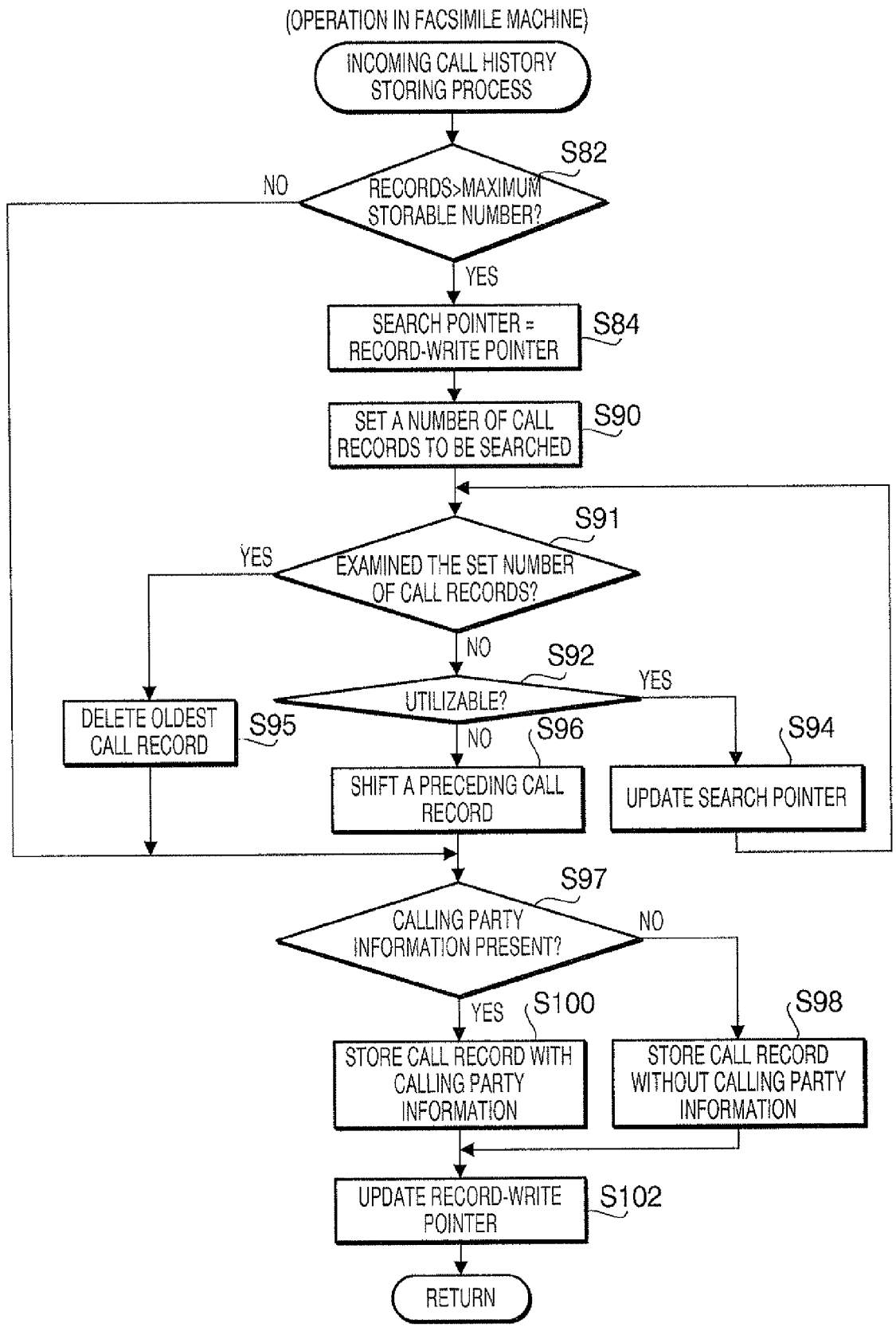
FIG. 5 is a flowchart to illustrate an operation for a call record storing process in the facsimile machine according to the embodiment of the present invention.

The CPU 11 controls each of the above units according to signals which are exchanged through the NCU 19 for data communication including facsimile data exchange and telecommunication. The ROM 12 is a non-rewritable memory to store programs to be executed in the facsimile machine 1. Programs, of which behaviors are illustrated in flowcharts shown in FIGS. 4 and 5, are stored in the ROM 12.

The EEPROM 13 is a nonvolatile rewritable memory, which includes an incoming call history memory area 131, a telephone directory area 132, a record creation setting flag area 133, a display setting flag area 134, a automatic answering mode setting flag area 135, and a ring tone setting area 136. The incoming call history memory area 131 is a memory area to store information concerning incoming call records.

Figure 3:
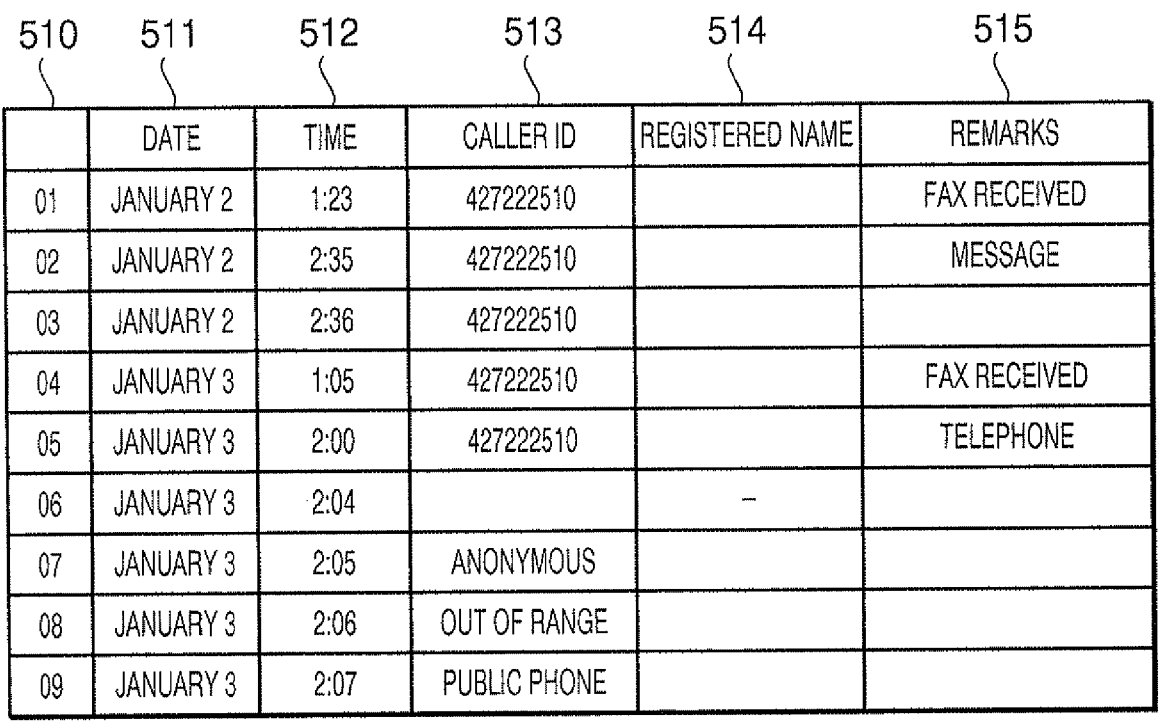
FIG. 3 illustrates incoming call history to be displayed on an LCD (liquid crystal display) of the facsimile machine according to the embodiment of the present invention.

FIG. 3 illustrates the incoming call history, stored in the incoming call history memory area 131, to be displayed in an incoming call history window 51 on the LCD 5 of the facsimile machine 1 according to the embodiment of the present invention. The incoming call history window 51 includes a record number column 510, in which record numbers are indicated, a call-income date column 511, in which dates of the incoming calls being received are indicated, a call-income time column 512, in which times of the incoming calls being received are indicated, a caller ID column 513, in which numbers of the callers are indicated, a calling party name column 514, in which registered names of the callers corresponding to the caller IDs are indicated, and a remarks column 515. Information included in one line to be displayed in the incoming call history window 51 corresponds to a call record of an incoming call. The call records are created upon receipt of the incoming calls based on the conditions in which the incoming calls are received. The call records are accumulated to make an incoming call history as shown in the incoming call history window 51. When a user enters a predetermined instruction to display the incoming call history, the accumulated incoming call history stored in the incoming call history memory area 131 is output through the incoming call history window 51.

The caller ID column 513 is a column to display calling party information. The calling party information in the present embodiment refers to information which identifies the caller devices (calling parties) and is transmitted from the switchboard 29 to the receiver parties (i.e., the facsimile machine 1) in the so-called caller ID display service. The calling party information is not available when the receiver party is not subscribed to the caller ID display service. The calling party information is also not receivable when the connection to the line is in a faulty condition even if the receiving parties are subscribed to the caller ID display service.

When an incoming call is received along with the calling party information, a call record including the calling party information is created and stored in the incoming call history memory area 131. When an incoming call is received without the calling party information, a call record without the calling party information is created and stored in the incoming call history memory area 131. The caller ID column 513 for the incoming call without the calling party information is thus presented to be blank in the incoming call history window 51 (e.g., see the call record for an incoming call with a record number 6).

The calling party information may includes, for example, a telephone (facsimile) number of the calling party, "anonymous" indication for anonymous calling parties, "out of range" indication for calling parties who are out of range (e.g., abroad) for the caller ID display service, "public phone" indication for calls made by public phones.

It is to be noted that the incoming call history window 51 presents overall history concerning the incoming calls including the call records which include the calling party information and the call records which do not include the calling party information; thus, the incoming call history can be presented to the user, and the user can be notified of each incoming call. The user may, depending on circumstances, recognize the calling parties even without the calling party information; therefore, the incoming call record without the calling party information can be valuable to the user.

In the incoming call history window 51, the call records including the calling party information and the call records with no calling party information are listed in chronological order, in which the calls were received. Therefore, the user can easily realize the order of the calls being received and find a desired call record.

The calling party name column 514 includes fields to indicate registered names of the calling parties when the telephone (facsimile) number of the calling parties are found to coincide with telephone (facsimile) names registered in the facsimile machine 1. Thus, the calling parties can be identified more easily than a case in which solely the telephone (facsimile) numbers of the calling parties are displayed.

The remarks column 515 includes fields to indicate types of the incoming calls. For example, "FAX received" indication refers to a received incoming facsimile call (i.e., a facsimile message is received), "telephone" indication refers to a received incoming telephone call, and "message" indication refers to an incoming call received during the automatic answering mode and a message left by the caller being recorded. Thus, the user can use the information indicated in the remarks column 515 to identify the caller parties and recall the responses to the calls Referring back to FIG. 2, the telephone directory area 132 is a memory area in which telephone (facsimile) numbers of the calling parties are registered in association with the names of the calling parties.

The record creation setting flag area 133 is an area to set a flag which indicates as to whether a call record of an incoming call received without the calling party information should be created. When a value 1 is set in the record creation setting flag area 133, the call record is created for an incoming call received with the calling party information and for an incoming call received without the calling party information and stored in the incoming call history memory area 131. When a value 0 is set in the record creation setting flag area 133, the call record is created solely for an incoming call received with the calling party information. The values to be set in the record creation setting flag area 133 can be changed according to the user's operation.

The display setting flag area 134 is an area to set a flag which indicates as to whether a call record of an incoming call received without the calling party information should be displayed in the incoming call history window 51. When a value 1 is set in the display setting flag area 134, the call records for an incoming call received with the calling party information and for an incoming call received without the calling party information are listed in the incoming call history window 51. When a value 0 is set in the display setting flag area 134, the call records solely for incoming calls received with the calling party information are listed in the incoming call history window 51. The values to be set in the display setting flag area 134 can be changed according to the user's operation.

The automatic answering mode setting flag area 135 is an area to set a flag which indicates as to whether the facsimile machine 1 should be set in the automatic answering mode, in which connection with an incoming call is automatically established when the incoming call enters and a predetermined message to notify the caller of unavailability of the receiving party (user) is returned to the calling party. When a value 1 is set in the automatic answering mode setting flag area 135, the automatic answering mode is activated. When a value 0 is set in the automatic answering mode setting flag area 135, the facsimile mode is operated in an attended mode, and the automatic answering mode is inactivated.

The ring tone setting area 136 is an area to set a number of times of a ring tone to be made before the line for an incoming call is automatically connected. In other words, when the count of the generated ring tone exceeds the number set in the ring tone setting area 136, the line is automatically connected. In the present embodiment, when the number set in the ring tone setting area 136 is 0, the ring tone is generated for an unlimited number of times. That is, the line is not automatically connected regardless of the count of the ring tone.

The values to be set in the automatic answering mode setting flag 135 and the ring tone setting area 136 are entered according to the user's operations to the facsimile machine 1.

The RAM 14 is a memory device to temporarily store various data concerning the operations to be executed in the facsimile machine 1. The RAM 14 is provided with a caller ID memory area 141, in which the calling party information transmitted from the switchboard 29 is temporally stored when an incoming call reaches. When an incoming call reaches, but the telephone number of the calling party is not transmitted from the switchboard 29, the caller ID memory area 141 is cleared to zero. Thus, when the caller ID memory area 141 includes a value other than 0, it is determined that the calling party information is received. When the caller ID memory area 141 indicates 0, it is determined that the calling party information for the incoming call is not received.

The image memory 15 is a memory device configured with a DRAM (Dynamic RAM), in which bit images for communication history, image data, and print data are stored. The audio memory 16 is a memory device to store an answering message to be transmitted to the calling party and an incoming message transmitted from the calling party. The audio memory 16 may be also configured with a DRAM.

The audio LSI 17 is a converter to convert analog audio signals received through the NCU 19 into digital audio signals. Further, the audio LSI 17 converts digital audio signals generated in the facsimile machine 1 into analog audio signals so that the converted analog audio signals are output through the NCU 19, the amplifier 27, and a speaker 28.

The modem 20 modulates and demodulates image data to transmit to the NCU 19. Further, various instructive signals to control the transmission are transmitted from and received in the modem 20. The buffer 21 temporarily stores data including the image data, which is encoded to be exchanged between the facsimile machine 1 and a distant calling/receiving party. The scanner unit 22 reads an image formed on the original document, which is inserted into the facsimile machine 1 through the document inlet 6. The encoding unit 23 encodes the image read by the scanner unit 22. The decoding unit 24 decodes image data received from a calling party and stored in the buffer 21 and the image memory 15. The decoded image data is passed to the printer unit 25 to be output on a recording sheet. The amplifier 27 sounds the connected speaker 28 to output sounds such as a ring tone and voices.

The facsimile machine 1 configured as above is connected to a telephone line 31, which is connected further to the switchboard 29. The switchboard 29 is connected with the other switchboards (not shown) in the telephone network through a telephone line 32. Furthermore, one of the other switchboards is connected with the calling party.

Next, an operation to process an incoming call in the facsimile machine 1 will be described with reference to FIG. 4. FIG. 4 is a flowchart to illustrate the operation to process an incoming call in the facsimile machine 1 according to the embodiment of the present invention. The operation is initiated when a calling signal from the switchboard 29 is received. In the present example, the record creation setting flag area 133 is set to 1, which indicates that the call record is created for an incoming call received with the calling party information and for an incoming call received without the calling party information and stored in the incoming call history memory area 131.

When the operation starts, in S2, with the line maintained open, it is examined to judge as to whether calling party information is received. If the facsimile machine 1 is subscribed to the caller ID display service, the caller ID is transmitted from the switchboard 29 to be received by the facsimile machine 1.

When the calling party information is received (S2: YES), in S3, the caller ID included in the calling party information is extracted and written in the caller ID memory area 141. Thereafter, in S4, a call record storing process is executed. In the call record storing process, a call record concerning the incoming call is created and stored in the incoming call history memory area 131. Thereafter, in S6, a receiving process is executed. In the receiving process in the present embodiment, a process similar to one of processes executed in S16 (an automatic answering process), S26 (a responding process), and S36 (a communication process) is executed. More specifically, if the facsimile machine 1 is set in the automatic answering mode, the automatic answering process, in which a preliminarily prepared message is transmitted to the calling party, is executed. If the automatic answering mode in not activated, and the handset is maintained on the hookswitch, a responding process is executed. In the responding process, a message to notify the calling party of temporal unavailability of the receiving party (e.g., "please wait for a moment") is transmitted to the calling party, and a pseudo ring tone is output from the speaker 28 of the facsimile machine 1 to notify the user of the facsimile machine 1 of the incoming call. When the handset 3 is lifted off the hookswitch, the communication process, in which the line is connected, is activated. If the calling party transmits facsimile data, the facsimile data is received in the communication process in S6.

In S2, if the facsimile machine 1 is not subscribed to the caller ID display service, or if the calling party information fails to be received (S2: NO), in S7, the caller ID memory area 141 is cleared to 0 to indicate that no calling party information was received.

In S8, an operation mode of the facsimile machine 1 is determined. When a value 1 is set in the automatic answering mode setting flag 135, it is determined that the facsimile machine 1 is in the automatic answering mode (S8: automatic answering mode). Thereafter, in S10, it is examined to judge as to whether the count of the ring tone starting from the point of entry exceeds a predetermined value.

In S10, if the count does not exceed the predetermined value (S10: NO), S10 is repeated until the count exceeds the predetermined value. When the count exceeds the predetermined value (S10: YES), in S12, the line between the switchboard 29 and the facsimile machine 1 is connected. It is to be noted that, in this flow, the line is connected automatically without having the handset lifted off the hookswitch.

Thereafter, in S14, a call record storing process is executed. In S14, based on the judgment that the automatic answering mode is activated, no calling party information is received, and the line is automatically connected, the call record storing process is executed, and the call record for the incoming call is stored.

Thereafter, in S16, the automatic answering process, in which the prepared message is transmitted to the calling party, is executed. When the calling party attempts to leave a message, the pronounced message is recorded in the automatic answering process.

In S8, when a value 0 is set in the automatic answering mode setting flag 135, it is determined that the facsimile machine 1 is in the attended mode (S8: attended mode). Thereafter, in S18, it is examined to judge as to whether a value 0 is set in the ring tone setting area 136.

In S18, when a value other than 0 is set in the ring tone setting area 136 (S18: NO), in S20, it is examined to judge as to whether the count of the ring tone starting from the point of entry exceeds the value set in the ring tone setting area 136.

In S20, if the count does not exceed the value in the ring tone setting area 136 (S20: NO), S20 is repeated until the count exceeds the value. When the count exceeds the value set in the ring tone setting area 136 (S20: YES), in S22, the line between the switchboard 29 and the facsimile machine 1 is connected. It is to be noted that, in this flow, the line is connected automatically without having the handset lifted off the hookswitch. Thereafter, in S24, the call record storing process is executed. In S24, based on the judgment that the line is automatically connected, the call record storing process is executed, and the call record for the incoming call is stored.

Thereafter, in S26, the responding process is executed, and a message to notify the calling party of temporal unavailability of the receiving party (e.g., "please wait for a moment") is transmitted to the calling party, and a pseudo ring tone is output from the speaker 28 of the facsimile machine 1 to notify the user of the facsimile machine 1 of the incoming call. If the calling party transmits facsimile data, the facsimile data is received in the responding process in S26.

When the value 0 is set in the ring tone setting area 136 (S18: YES), i.e., when the count of the ring tone to be generated before the line is automatically connected is unlimited, in S28, it is examined to judge as to whether the count of the ring tone starting from the point of entry exceeds a predetermined threshold count (e.g., 3), which is preliminarily set in the EEPROM 13. The threshold count can be preliminarily set by the user and stored in the EEPROM 13.

In S28, if the count does not exceed the predetermined threshold count (S28; NO), S28 is repeated until the count exceeds the predetermined threshold count. When the count exceeds the threshold count (S28: YES), in S30, based on the judgment that no calling party information is received, the call record storing process is executed, and the call record for the incoming call is stored.

Thereafter, in S34, it is examined to judge as to whether the handset 3 is lifted off the hookswitch. If the handset 3 is not lifted (S34: NO), S34 is repeated. When the handset 3 is lifted (S34: YES), the line is connected between the switchboard 29 and the facsimile machine 1, and in S36, the communication process is executed. Thereafter, the operation is terminated.

It is to be noted that the above-described operation is forcibly terminated when the line is disconnected by the calling party, although detailed description and illustrative steps for the forcible termination are omitted. Further, when the handset 3 is lifted off the hookswitch during the above-described operation, the line is connected, and the communication process is executed. Thereafter, the operation is terminated. Optionally, when a value 0 is set in the record creation setting flag area 133, a call record without the calling party information is not created or stored in incoming call history memory area 131. Therefore, S14, S24, S30 are skipped.

Next, an operation in the call record storing process (S4, S14, S24, S30) will be described with reference to FIG. 5. FIG. 5 is a flowchart to illustrate the operation in the call record storing process in the facsimile machine 1 according to the embodiment of the present invention.

In the call record storing process, in S82, it is examined to judge as to whether a number of the records stored in the incoming call history memory area 131 exceeds a maximum storable number, which is 30 in the present embodiment. If the number of records is within the maximum storable number (882: NO), the operation proceeds to S97.

When the number of records exceeds the maximum storable number (S82: YES), in S84, a call record indicated by a record-write pointer is specified to be a call record indicated by a search-write pointer.

The record-write pointer 1311 and the search pointer 1312 will be described with reference to FIGS. 6A-6C. FIGS. 6A-6C includes diagrams to illustrate the record-write pointer 1311 and the search pointer 1312 in the incoming call history memory area 131 according to the embodiment of the present invention. In the incoming call history memory area 131, a call record for an incoming call is presented in a horizontal line, which is identified by a record number in the rightmost column.

The record-write pointer 1311 is a pointer to indicate a call record with the oldest incoming date. As shown in FIG. 6, the call records in the incoming call history memory area 131 are accumulated in the horizontal lines in chronological order starting from the call record indicated by the record-write pointer 1311 toward the bottom. When a call record is stored in the lowermost line in the incoming call history memory area 131, a new call record created following the call record in the lowermost line is now stored in the topmost horizontal line in the incoming call history memory area 131. When a further new call record is created, the call record is stored in the second topmost horizontal line in the incoming call history memory area 131. Succeeding call records will be stored in the further lower horizontal lines to follow.

The search pointer 1312 is a pointer to indicate a call record to be examined in the call record storing process. In S84 in the call record storing process, the call record indicated by the record-write pointer 1311 is corresponded to the call record indicated by the search pointer 1312; therefore, the call record with the oldest incoming date is specified to be examined.

Referring back to FIG. 5, in S90, a number of call records to be searched is set. In the present embodiment, "30" being the maximum storable number is set.

In S91, it is judged as to whether the 30 call records as set in S90 have been examined. When it is determined that the 30 call records have not been examined yet (S91: NO), in S92, it is judged as to whether the call record currently indicated by the search pointer 1312 is utilizable data. In the present embodiment, the utilizable data refers to a call record with the calling party information including a telephone (facsimile) number in the caller ID column. Additionally, in the present embodiment, a call record with the calling party information but not including a telephone (facsimile) number is not judged to be "utilizable," even if the calling party information include information such as "anonymous" indication, "out of range" indication, or "public phone" indication.

In S92, if it is judged that the call record currently indicated by the search pointer 1312 is utilizable data (S92: YES), in S94, the search pointer 1312 is updated, and the record number of the call record to be indicated by the search pointer 1312 is incremented by one. The operation returns to S91 to repeat S91, S92, and S94.

When the 30 call records as set in S90 are entirely examined (S91: YES), in other words, if the entire call records stored in the incoming call history memory area 131 are utilizable data, in S95, the oldest call record indicated by the record-write pointer 1311 is removed from the incoming call history memory area 131. The operation proceeds to S97 thereafter.

In S92, meanwhile, if it is judged that the call record currently indicated by the search pointer 1312 is not utilizable data (S92: NO), in other words, if the call record does not include a telephone (facsimile) number, in S96, the call record is cleared and replaced with a preceding call record, which is in a next-lower horizontal line in the incoming call history memory area 131 and shifted to overwrite the call record indicated by the search pointer 1312.

Behaviors to clear the call record to replace with the preceding call record will be described with reference to FIGS. 6B and 6C. In this example, the call record with the record number 17, which does not include a telephone (facsimile) number in the caller ID column, is indicated by the search pointer 1312 and determined to be not utilizable.

In the clearing operation, when the call record 17 is determined to be non-utilizable, call records preceding the call record 17, specifically the call records included in a range starting from the call record 15 indicated by the record-write pointer 1311 to the call record 16 immediately preceding the call record 17, are shifted toward the bottom for one horizontal line in the incoming call history memory area 131 to overwrite the call record 17.

Thus, the call record 17 indicated by the search pointer 17 is deleted. Simultaneously, a horizontal line indicated by the record-write pointer 1311 becomes blank (see FIG. 6C). When the call record 17 without the utilizable calling party information (i.e., a telephone number) is deleted, the operation proceeds to S97 in FIG. 5.

In S82, if the number of records is within the maximum storable number (S82; NO), the operation also proceeds to S97. It is to be noted in S97 that the incoming call history memory area 131 includes at least one blank horizontal line.

In S97, it is judged to determine as to whether the incoming call is received along with the calling party information. If no calling party information is included, and the caller ID memory area 141 is cleared to 0 (S97: NO), in S98, a call record without the calling party information for the incoming call is created to be stored in the horizontal line indicated by the record-write pointer 1311 in the incoming call history memory area 131. Even the call record without the calling party information includes at least the received date and time of the incoming call, and a type of the incoming call (e.g., facsimile transmission, telephone, automatically answered to leave a voice message) which is to be indicated in the remarks area (see FIG. 3).

In S97, if the calling party information is received along with the incoming call, and the caller ID memory area 141 includes a value other than 0 (S97: YES), in S100, a call record for the incoming call is created to be stored in the horizontal line indicated by the record-write pointer 1311 in the incoming call history memory area 131. The call record to be stored in S100 includes at least the received date and time of the incoming call, a type of the incoming call, the calling party information. Additionally, when a name corresponding to the calling party information is registered in the telephone directory area 132, the registered name is included.

Thereafter, in S102, the record-write pointer 1311 is updated, and the record number of the call record to be indicated by the record-write pointer 1311 is incremented by one. Thereafter, the call record storing process is terminated.

According to the call record storing process, when a number of the call records to be stored in the incoming call history memory area 131 exceeds a predetermined number, the older call records, having no telephone (facsimile) number in the calling party information, which are considered to be rather non-utilizable, are precedently deleted. Therefore, the storage area to store the call records can be effectively used for the utilizable information.

Although an example of carrying out the invention has been described, those skilled in the art will appreciate that there are numerous variations and permutations of the communication device that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the call record in the above embodiment includes at least received date and time of the incoming call, a type of the incoming call, and additionally, the calling party information and a name of the calling party. However, information to be included in the call record is not limited to the above.

For another example, in the above embodiment, the record creation setting flag area 133, in which a setting for creating the call record without the calling party information is stored, and the display setting flag area 134, in which a setting for displaying the call record without the calling party information is stored, are provided to the user to select. Alternatively, a setting for storing or displaying the call record having no telephone (facsimile) number in the calling party information can be selected by the user.

Further, in the above embodiment, when the call record is newly created to be stored in the incoming call history memory area 131, which is already filled with the maximum storable number of call records, at least one call record is deleted to be replaced with the preceding call record. However, the horizontal line in which the deleted call record was stored may be replaced with the newly-created call record.

What is claimed is:

1. A communication device, comprising:
   a calling party information receiving unit configured to receive calling party information, which is information concerning a calling party of an incoming call to the communication device and provided by a switchboard upon receipt of the incoming call;
   a first call record storing unit configured to create a call record including the calling party information based on receiving conditions of the incoming call when the calling party information is received by the calling party information receiving unit and store the created call record in a call record storage unit;
   a second call record storing unit configured to create a call record without the calling party information based on receiving conditions of the incoming call when the calling party information is unavailable to the calling party information receiving unit and store the created call record in the call record storage unit;
   a call record output unit configured to output the call records inclusive of the call records stored by the first call record storing unit and by the second call record storing unit; and
   a connection unit configured to automatically establish the connection with the incoming call when count of a ring tone indicating the incoming call starting from a point of entry exceeds a predetermined value, and
   wherein the second call record storing unit is further configured to create the call record without the calling party information, when the calling party information is unavailable to the calling party information receiving unit and when the connection with the incoming call without the calling party information is automatically the connection unit.

2. The communication device according to claim 1, further comprising:
   an operation mode judging unit configured to judge as to whether an operation mode of the communication device is an automatic answering mode, in which the connection with the incoming call is automatically established and a predetermined answering message is transmitted to the calling party,
   wherein the second call record storing unit is further configured to create to store the call record when the operation mode judging unit judges that the communication device is in the automatic answering mode, and the connection with the incoming call is automatically established by the connection unit.

3. The communication device according to claim 1,
   wherein the call record output unit is further configured to display the call records, created and stored in the call record storage unit by the first call record storing unit and the second call record storing unit, in chronological order in which the incoming calls were received in the communication device.

4. The communication device according to claim 1,
   wherein the calling party information includes a caller ID information identifying the calling party and status indication of the calling party, the status indication including "anonymous," "out of range," and "public phone."

5. The communication device according to claim 1,
   wherein the call record includes information concerning the incoming call, including receiving date of the incoming call, receiving time of the incoming call, and a type of the incoming call.

6. The communication device according to claim 1, further comprising:
   a judging unit configured to judge utility of the call record stored in the record storing unit; and
   a removal unit to remove the call record from the call record storage unit when a number of the call records in the call record storage unit exceeds a predetermined number and when the judging unit judges that the call record is non-utilizable.

7. The communication device according to claim 6, further comprising:
   a caller ID information adding unit configured to extract a caller ID identifying the calling party of the incoming call from the calling party information and add the extracted caller ID in the call record when the calling party information is provided from the switchboard,
   wherein the judging unit is further configured to judge that the call record is utilizable when the caller ID is included in the call record and that the call record is non-utilizable when the caller ID is not included in the call record.

8. The communication device according to claim 7,
   wherein the call record includes information concerning the incoming call, including receiving date of the incoming call, receiving time of the incoming call, and a type of the incoming call; and
   wherein the removal unit is further configured to remove the call record with the oldest receiving date among the call records stored in the call record storage unit and judged to be non-utilizable by the judging unit.

9. The communication device according to claim 7, wherein the caller ID is a telephone number of the calling party.

10. The communication device according to claim 7, wherein the caller ID is a facsimile number of the calling party.

11. The communication device according to claim 1, further comprising a record creation setting unit configured to set activation and inactivation of the second call record storing unit.

12. The communication device according to claim 1, further comprising an output setting unit configured to set as to whether the call record created and stored by the second call record storing unit should be output by the call record output unit.

* * * * *